United States Patent [19]

Imada et al.

[11] 4,315,808

[45] Feb. 16, 1982

[54] METHOD FOR MODIFYING SURFACE PROPERTIES OF SHAPED ARTICLES OF VINYL CHLORIDE BASED RESIN WITH LOW TEMPERATURE PLASMA

[75] Inventors: Kiyoshi Imada, Omiya; Susumu Ueno; Hirokazu Nomura, both of Ibaraki, all of Japan

[73] Assignee: Shin-Etsu Chemical Co. Ltd., Tokyo, Japan

[21] Appl. No.: 149,417

[22] Filed: May 13, 1980

[30] Foreign Application Priority Data

May 21, 1979 [JP] Japan .................................. 54-62349

[51] Int. Cl.$^3$ ................................................ C08F 2/46
[52] U.S. Cl. ...................................... 204/169; 264/22; 264/83; 264/85
[58] Field of Search ........................ 264/83, 22, 85; 204/159.2, 169

[56] References Cited

U.S. PATENT DOCUMENTS 3,846,521 11/1974 Osterholtz ............................. 264/22
4,046,843 9/1977 Sano et al. ............................. 264/22

FOREIGN PATENT DOCUMENTS 2433549 7/1979 France .
2027038 2/1980 United Kingdom .

*Primary Examiner*—James H. Derrington
*Attorney, Agent, or Firm*—Toren, McGeady and Stanger

[57] ABSTRACT

The invention provides a novel method for preventing bleeding of a plasticizer or other additive ingredients contained in a shaped article of a vinyl chloride-based resin composition on to the surface of the article by the treatment with low temperature plasma. Different from conventional procedures for the plasma treatment, much improved reliability and reproducibility as well as effectiveness are obtained by subjecting the article to intermittent exposure to the plasma atmosphere instead of continuous exposure. In the inventive method, the overall treatment time is an alternate sequence of exposure times, each being of the length of 0.001 second to 1000 seconds, and repose times, each being also of the length of 0.001 second to 1000 seconds. The gas for the plasma atmosphere is desirably an inorganic gas selected from the gases other than oxygenic gases, halogen containing gases and sulfur containing gases.

4 Claims, No Drawings

METHOD FOR MODIFYING SURFACE PROPERTIES OF SHAPED ARTICLES OF VINYL CHLORIDE BASED RESIN WITH LOW TEMPERATURE PLASMA

BACKGROUND OF THE INVENTION

The present invention relates to a method for modifying surface properties of a shaped article of a vinyl chloride-based resin or, more particularly, to a method for reducing bleeding or blooming of a plasticizer or other additive ingredients contained in a shaped article of a vinyl chloride-based resin on the surface of the article by the treatment with low temperature plasma.

Needless to say, vinyl chloride-based resins belong to one of the most important classes of thermoplastic resins owing to their excellent and very versatile properties along with their relative inexpensiveness so that they are widely employed in a variety of application fields as shaped in various articles. In particular, rigidity or flexibility of shaped articles of vinyl chloride-based resins can be adequately controlled by formulating the resin with a plasticizer. The thus plasticized resins can give relatively flexible shaped articles so that plasticized resin compositions are fabricated into films, sheets, synthetic leathers, tubes, hoses, bags, coating materials and the like used in various fields such as medical instruments, packaging materials for foodstuffs, materials for agricultural use, building materials and the like.

Furthermore, it is a very common practice that vinyl chloride-based resins are formulated with various kinds of additive ingredients such as flame retardants, antioxidants, ultraviolet absorbers, lubricants and others according to the particular needs for the improvements of the workability of the resin composition as well as the properties of the articles shaped with the resin composition.

One of the most serious problems in these articles shaped with the vinyl chloride-based resin composition formulated with the additive ingredients, typically, a plasticizer, is that the plasticizer contained in the shaped article may sometimes migrate toward the surface of the article and exude on the surface of the article in the long run resulting in inferior properties of the plasticized vinyl chloride-based resin articles. This phenomenon is usually called "bleeding," prevention of which is one of the most important problems difficult to solve in the technology of synthetic resin processing.

Bleeding of the plasticizer is undesirable not only due to the deterioration of the properties of the shaped articles but also due to the transfer of the plasticizer exuded on the surface of an article to the surface of the other body being in contact with the shaped article of the plasticized vinyl chloride-based resin composition. Along with the loss in the beauty of the surface appearance of the articles, bleeding or transfer of the plasticizer is especially undesirable when the shaped article is used in a medical instrument or in contact with foods because safety of plasticizers to the human health is not established in general so that the use of plasticized vinyl chloride-based resin compositions in these fields is largely limited. Similar problems are involved in the use of shaped articles containing the other kinds of additive ingredients.

Various attempts have been made to solve the above described problem of surface bleeding of plasticizers and the like. The methods hitherto proposed for the purpose include a method of treatment or irradiation of the surface of the articles with ionizing radiation, high-energy electron beams or ultraviolet light, a method of providing coating films on the surface of the articles with a suitable synthetic resin capable of preventing surface bleeding of the plasticizer and a method of chemical treatment in which certain special chemicals are applied on to the surface of the articles or admixed in the composition of the vinyl chloride-based resin for shaping the articles. These methods are, however, not satisfactory in most cases in the effectiveness with, instead, an adverse effect of impairing several advantageous properties inherently possessed by the vinyl chloride-based resins.

For example, irradiation with ionizing radiation or high-energy electron beams may produce crosslinking between the polymer molecules not only in the superficial layer of the shaped article but also in the subsurface layer due to the excessively high energy of the radiation so that the flexibility as the most characteristic feature of the plasticized vinyl chloride resin articles is largely lost. Treatment with ultraviolet light is undesirable by the reason of coloring in the surface due to the degradation of the polymer molecules in the surface layer of the shaped article. The chemical means is not free from the problems of surface erosion of the shaped articles and the poor adhesivity and durability of the films provided on the surface of the article.

Recently, it has been proposed that the surface bleeding of a plasticizer in a shaped article of a vinyl chloride-based resin can be prevented by exposing the article to an atmosphere of low temperature plasma of a gas such as rare gases, oxygen, nitrogen, carbon monoxide and the like of low pressure generated by glow discharge. This method of plasma treatment is effective for preventing migration and surface bleeding of the plasticizer by the formation of highly crosslinked layer only in the very surface of the article without affecting the desirable properties of the article as a bulk. It has been shown by the inventors that the plasma treatment of shaped articles of vinyl chloride-based resins is also effective in improving the wettability, adhesivity and printability as well as in reducing electrostatic charging and surface stain.

When the object of the plasma treatment is the improvement of the properties other than plasticizer bleeding as mentioned above, no rigorous control of the conditions is required in the plasma treatment. On the other hand, the prevention of plasticizer bleeding on the surface by the plasma treatment can be achieved only by a very careful control of the treatment conditions for the individual articles. For example, when the plasma treatment of a plasticized polyvinyl chloride shaped articles is undertaken with varied length of treatment time, the amount of the plasticizer bleeding first decreases with the increase of the treatment time but, after reaching a minimum point, the amount of the plasticizer bleeding again increases with the increase of the treatment time. This phenomenon presents a difficult technical problems of determining the optimum treatment time for the individual articles. Further, the effect of the plasma treatment has a threshold value below which no expected effect can be obtained with the plasma treatment and the effect of the plasma treatment appears only when the treatment time exceeds the threshold.

The above mentioned optimum range of the treatment time becomes narrower and narrower as the electric power of the plasma discharge is increased with an object of decreasing the overall treatment time presenting an unsurmountable difficulty. When the electric power for the plasma discharge is extremely large, practically no effect of prevention of the plasticizer bleeding can be obtained. These circumstances of poor reproducibility greatly lessen the practical value of the plasma treatment for preventing the plasticizer bleeding.

The above described disadvantages of the plasma treatment method take place irrespectively of the parameters of plasma conditions such as kind, pressure and flow rate of the plasma gas and the formulation of the vinyl chloride-based resin compositions resulting in reduced practical values of the method, especially, in the rapid or continuous treatment of general purpose shaped articles of the resin compositions with low temperature plasma.

SUMMARY OF THE INVENTION

Thus, an object of the present invention is to provide a novel and improved method for the modification of the surface properties of shaped articles of vinyl chloride-based resin compositions by the treatment with low temperature plasma. In particular, the inventive method is effective in preventing the bleeding of a plasticizer formulated in the resin composition on the surface of the article without the problems in the prior art method of plasma treatment and the method is particularly advantageous to give reproducible results of treatment easy to control.

The inventive method for modifying surface properties of a shaped article of a vinyl chloride-based resin composition comprises exposing the shaped article intermittently to an atmosphere of low temperature plasma of an inorganic gas under a pressure not exceeding 10 Torr.

In other words, the overall treatment time is an alternate sequence of exposure times and repose times and each of the exposure times and each of the repose times last 0.001 second to 1000 second, respectively.

The above described method of intermittent plasma treatment is so effective that not only very good reproducibility is obtained in the results of the treatment but also overall treatment time can be shortened so that the power efficiency and the productivity of the plasma facilities are remarkably improved.

DETAILED DESCRIPTION OF THE PREFERRED EMBODIMENTS

As is described above, the surface properties of a shaped article of a vinyl chloride-based resin composition formulated with a plasticizer or other additives can be efficiently modified by the inventive method according to which the shaped article is exposed intermittently to an atmosphere of low temperature plasma of an inorganic gas under a pressure of 10 Torr or below in an alternate sequence of exposure times each lasting 0.01 second to 1000 seconds and repose times each lasting also 0.001 second to 1000 seconds.

The intermittent exposure to plasma can be carried out of course, by merely shielding the article under the treatment from the plasma atmosphere periodically by means of a suitable shielding shutter or by periodically deflecting the plasma flow by means of electric fields and/or magnetic fields. The most reliable and effective method for the intermittent exposure to plasma atmosphere is, however, the control of the power source or the high frequency generator for the plasma discharge. For example, the high frequency generator is connected to the power source through a suitable intermittent time switch or the high frequency generator is provided with a built-in circuit for generating the high frequency power output in square pulses.

In the alternate sequence of the exposure times and the repose time, it is noted that shorter length of each exposure time is preferred provided that the repose time is constant in order to obtain reliable and reproducible results. The length of each of the exposure times is determined depending on the electric power, formulation of the resin composition, conditions of the gaseous atmosphere and the like but it is usually in the range from 0.001 second to 1000 seconds or, preferably from 0.01 second to 100 seconds.

Shorter exposure times each than 0.001 second may be as effective as the exposure times above defined but not preferable by the reasons of difficulty in the reliable intermittent control of the plasma generation requiring very elaborate equipments. Exposure times each longer than 1000 seconds cannot give any desired effects over the conventional method of continuous exposure.

On the other hand, it is noted that shorter length of each repose time is preferred provided that the exposure time is constant in order to obtain good reliability and high effectiveness in the results of the treatment. The length of each of the repose times should be in the range from 0.001 second to 1000 seconds or, preferably, in the range from 0.01 second to 100 seconds. It is of course that a repose time exceeding 1000 seconds is also effective but such a long repose time is undesirable practically due to the excessively long overall time required for the plasma treatment. On the other hand, a repose time shorter than 0.001 second cannot give any advantageous results in comparison with a continuous plasma treatment.

During the repose time, the article under treatment may be kept in the same atmosphere of the gas as during the exposure time or may be kept in an atmosphere of high vacuum of a pressure of 0.01 Torr or below. It should be noted in this case, however, the article under treatment must not be brought into contact with an active gas such as oxygen during the repose time since otherwise the beneficial effects by the intermittent exposure are totally lost and the results are the same as in the continuous exposure.

The vinyl chloride-based resin as the base component of the shaped articles as the objective body of the inventive method includes not only homopolymeric vinyl chloride resins but also various kinds of copolymeric resins of vinyl chloride, of which the main component, say, 50% by weight or more, is vinyl chloride, with one or more of copolymerizable monomers exemplified by vinyl esters such as vinyl acetate, vinyl ethers, acrylic acid and esters thereof, methacrylic acid and esters thereof, maleic acid and esters and anhydride thereof, fumaric acid and esters thereof, aromatic vinyl compounds such as styrene, vinylidene halides such as vinylidene chloride, acrylonitrile, methacrylonitrile and olefins such as ethylene, propylene and the like.

As is understood from the objects of the present invention, the articles as the objective body of the inventive method are shaped with a vinyl chloride-based resin composition containing at least one kind of an additive ingredient liable to bleed or bloom on the surface of the shaped articles.

Plasticizers belong to one of the typical classes of such additive ingredients and the plasticizers, of which bleeding on the surface can be prevented effectively by the inventive method, include esters of phthalic acid such as dioctyl phthalate, dibutyl phthalate, butyl benzyl phthalate and the like, esters of aliphatic dibasic acids such as dioctyl adipate, dibutyl sebacate and the like, glycol esters such as esters of pentaerithritol, diethyleneglycol dibenzoate and the like, esters of aliphatic monocarboxylic acid such as methyl acetylricinoate and the like, esters of phosphoric acid such as tricresyl phosphate, triphenyl phosphate and the like, epoxidated oils such as epoxidated soybean oil, epoxidated linseed oil and the like, esters of citric acid such as acetyltributyl citrate, acetyltrioctyl citrate and the like, trialkyl trimellitates, tetran-octyl pyromellitate and polypropylene adipate as well as other kinds of plasticizers including polyester-based plasticizers.

The other classes of additive ingredients which may be contained in the vinyl chloride-based resin compositions are heat resistance improvers, lubricants, stabilizers, fillers, anti-oxidants, ultra-violet abosrbers, antistatic agents, anti-fogging agents, pigments, dyes, cross-linking aids and the like. The vinyl chloride-based resin composition may be a polymer blend of a vinyl chloride-based resin with one or more of the other kinds of polymeric materials such as high polymeric rubbery elastomers. These blending polymers are desirably contained in the resin composition in an amount not exceeding 50 parts by weight per 100 parts by weight of the vinyl chloride-based resin.

The means for fabricating the vinyl chloride-based resin composition into shaped articles is not particularly limitative including conventional molding means of vinyl chloride-based resin compositions such as extrusion molding, injection molding, compression molding, calendering, inflation method and the like. The shapes of the articles are also not limitative in so far as the articles has dimensions suitable for placing in an apparatus for plasma treatment.

The plasma discharge in the gaseous atmosphere of a pressure of 10 Torr or below is obtained by supplying an electric power of 10 to 10,000 watts to the electrodes of the apparatus. The frequency of the electric power supply is not limitative and may be direct current, low frequency, high frequency up to microwave range but most conveniently a frequency of 13.56 MHz is recommended. The mode of discharge can be corona discharge, spark discharge or silent discharge in addition to the preferred glow discharge. In any way, intermittent discharge is ensured with an intermittent timer switch built in the circuit for power source or a suitable circuit for generating the output as square pulses. The disposition of the electrodes is also not limitative including inside electrodes and exterior electrodes as well as a coil electrode connected to the high frequency generator by capacitive coupling or inductive coupling. In any way, it should be taken into consideration that the article under treatment is not adversely affected by the heat of discharge bringing about denaturation of the surface of the article.

The gas of the atmosphere is preferably inorganic since organic gases may cause formulation and deposition of polymeric matters on the surface of the article under treatment. Inorganic gases having no polymerizability in the plasma condition are exemplified by helium, neon, argon, nitrogen, nitrous oxide, nitrogen dioxide, oxygen, air, carbon monoxide, carbon dioxide, hydrogen, chlorine, halogen compounds such as hydrogen chloride, bromine cyanide and the like, and sulfur compounds such as sulfur dioxide, hydrogen sulfide and the like. These gases may be used either singly or as a mixture of two kinds or more. It should be noted, however, that oxygenic compounds, e.g. oxygen, air and nitrogen oxides, halogen compounds and sulfur compounds are less preferred by the reasons above described so that the atmospheric gas is desirably selected from rare gases, e.g. helium, neon and argon, nitrogen, carbon monoxide, carbon dioxide, hydrogen and the like which are inert against the supposed incipient species for the crosslink formation produced by the action of plasma in the surface layer of the article under treatment.

The pressure of the gaseous atmosphere during plasma treatment is in the range from 0.001 to 10 Torr or, preferably, from 0.01 to 1 Torr in order to obtain stable plasma discharge. The pressure during the repose time is not particularly limitative as is mentioned before but the most convenient way is to keep the pressure constant throughout the exposure times and the repose times.

Following are the examples to illustrate the method of the present invention in further detail including several comparative experiments.

In the following examples, the effectiveness of the plasma treatment was evaluated by determining the amount of the plasticizer in the shaped articles, e.g. sheets, of the vinyl chloride-based resin compositions leached out when the plasma-treated article was kept in contact with an organic solvent in the conditions described below.

Thus, the plasma-treated sheet was placed on the bottom of a cylindrical vessel of 100 ml capacity to expose 26 $cm^2$ area of the surface and 50 ml of n-hexane was introduced into the vessel so as to be in contact with the exposed surface of the sheet followed by shaking for 2 hours at 37° C. The amount of the plasticizer extracted into the solvent was determined by gas chromatography.

EXAMPLE 1

(Experiments No. 1 to No. 7)

A resin composition composed of 100 parts by a weight of a homopolymeric polyvinyl chloride resin (TK-1300, a product by Shin-Etsu Chemical Co., Japan), 50 parts by weight of dioctyl phthalate, 1.5 parts by weight of calcium stearate and 1.5 parts by weight of zinc stearate was kneaded in a roller mill at 160° C. for 10 minutes and fabricated by compression molding at 165° C. into sheets of 1 mm thickness.

A piece of the thus prepared sheets was placed in a plasma chamber into which carbon monoxide gas (Experiments No. 1 to No. 6) or a 1:9 by volume mixture of carbon monoxide and nitrogen (Experiment No. 7) was passed under a reduced pressure as indicated in Table 1 below. Low temperature plasma was generated in the plasma chamber by supplying a high frequency power to the electrodes of the apparatus from a high frequency generator controlled with an intermittent timer switch. The lengths of each exposure time and each repose time are given in Table 1. Experiments No. 4 and No. 6 were for comparative purpose and the low temperature plasma was generated continuously.

The sheet samples having been subjected to the intermittent or continuous plasma treatment to an overall treatment time as indicated in Table 1 were examined for the amount of the extracted plasticizer, i.e. dioctyl phthalate, in the manner described above. The results in mg are set out in Table 1.

EXAMPLE 2 the plasticizer, i.e. di(2-ethylhexyl) adipate, in mg are set out in the table.

TABLE 1

| Exp. No. | Exposure time, seconds | Repose time, seconds | Pressure, Torr | Amount of plasticizer extraction, mg Overall treatment time, seconds | | | | | | | | | | | | | | |
|---|---|---|---|---|---|---|---|---|---|---|---|---|---|---|---|---|---|---|
| | | | | 0 | 5 | 10 | 15 | 20 | 25 | 30 | 35 | 40 | 50 | 60 | 80 | 100 | 300 | 600 |
| 1 | 1 | 1 | 0.1 |  | 69 | 65 | 28 | 0 | — | 0 | — | — | — | — | — | 0 | 0 | 0 |
| 2 | 1 | 1 | 0.1 |  | 48 | 11 | 0 | 0 | — | 0 | — | — | — | — | — | 0 | 0 | 0 |
| 3 | 1 | 1 | 0.1 |  | 65 | 30 | 0 | 0 | — | 0 | — | — | — | — | — | 0 | 0 | 0 |
| 4 | — | — | 0.1 | 73 | — | — | — | 71 | — | — | — | 10 | — | 2 | 8 | 25 | 53 | 68 |
| 5 | 1 | 0.1 | 1 |  | 73 | 19 | 0 | 0 | — | 0 | — | 0 | 0 | 0 | — | — | — | — |
| 6 | — | — | 1 |  | — | 71 | — | 55 | 17 | 15 | 22 | 30 | 62 | 70 | — | — | — | — |
| 7 | 1 | 10 | 0.5 |  | — | — | — | 35 | — | 0 | — | 0 | — | 0 | 0 | 0 | — | — |
| 8 | 0.1 | 10 | 2 |  | — | — | — | 3 | — | — | — | 0 | — | 0 | 0 | 0 | — | — |
| 9 | — | — | 2 | 111 | — | — | — | 107 | — | — | — | 98 | — | 21 | 40 | 105 | — | — |

(Experiments No. 8 and No. 9)

A resin composition composed of 100 parts by weight of the same polyvinyl chloride resins as used in Example 1, 35 parts by weight of di(2-ethylhexyl) adipate and 3 parts by weight of barium stearate was kneaded in a roller mill at 160° C. for 10 minutes and fabricated by compression molding at 165° C. into sheets of 1 mm thickness.

A piece of the thus prepared sheet was placed in a plasma chamber under a pressure of 2 Torr with argon gas and low temperature plasma was generated in the chamber by supplying high frequency power of 1 kilowatt to the capacitively coupled electrodes from a high frequency generator controlled with an intermittent timer switch. The plasma treatment was intermittent in Experiment No. 8 with an exposure time of 0.1 second and a repose time of 10 seconds while the treatment was continuous in Experiment No. 9 for comparative purpose.

The plasma treatment was conducted with varied overall treatment times as indicated in Table 1 and the results of the determination of the extracted amounts of the plasticizer, i.e. di(2-ethylhexyl) adipate, in mg are set out in the table.

What is claimed is:

1. A method for modifying surface properties of a shaped article composed of a vinyl chloride-based resin composition and having a plasticizer therein which comprises subjecting the surface of the article to intermittent exposure to an atmosphere of low temperature plasma of an inorganic gas under a pressure in the range from 0.01 Torr to 1.0 Torr for a length of the treatment time which is an alternate sequence of at least five alternating exposure and repose times wherein the length of each of the exposure times is in the range from 0.001 second to 1000 seconds and the length of each of the repose times is in the range from 0.001 second to 1000 seconds.

2. The method as claimed in claim 1 wherein the inorganic gas is selected from the gases other than oxygenic gases, halogen compounds and sulfur compounds.

3. The method as claimed in claim 1 wherein the length of each of the exposure times is in the range from 0.01 second to 100 seconds.

4. The method as claimed in claim 1 wherein the length of each of the repose times is in the range from 0.01 second to 100 seconds.

* * * * *